Figure 4:
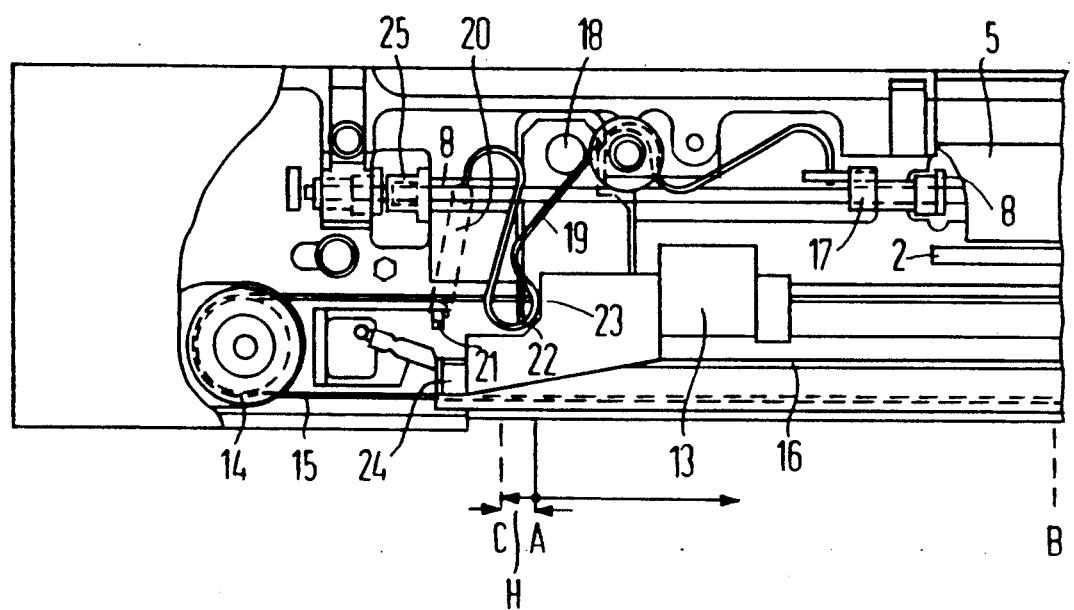

United States Patent [19]

Hickisch

[11] Patent Number: 5,192,973
[45] Date of Patent: Mar. 9, 1993

[54] COVERING AND CLEANING DEVICE FOR THE OPTICAL CHARACTER GENERATOR IN AN ELECTROPHOTOGRAPHIC PRINTING DEVICE

[75] Inventor: Gerhard Hickisch, Munich, Fed. Rep. of Germany

[73] Assignee: Siemens Aktiengesellschaft, Munich, Fed. Rep. of Germany

[21] Appl. No.: 473,950
[22] PCT Filed: Mar. 4, 1988
[86] PCT No.: PCT/DE88/00117
§ 371 Date: Feb. 13, 1990
§ 102(e) Date: Feb. 13, 1990
[87] PCT Pub. No.: WO87/02162
PCT Pub. Date: Apr. 9, 1987

[30] Foreign Application Priority Data

Aug. 27, 1987 [DE] Fed. Rep. of Germany ....... 3728663

[51] Int. Cl.$^5$ ................. G03G 21/00; G03G 15/04
[52] U.S. Cl. .................................. 355/215; 346/153.1
[58] Field of Search ............... 355/215, 30, 71; 354/5; 346/153.1

[56] References Cited

U.S. PATENT DOCUMENTS 3,710,099 1/1973 Chapman .
4,515,491 5/1985 Chevrel et al. .

FOREIGN PATENT DOCUMENTS 54-21732  2/1979 Japan .................................. 355/215
58-178343 10/1983 Japan .................................. 355/215
59-29276  2/1984 Japan .................................. 355/215
1008965 11/1965 United Kingdom .
WO87/02162 4/1987 World Int. Prop. O. .

Primary Examiner—Joan H. Pendegrass
Attorney, Agent, or Firm—Hill, Steadman & Simpson

[57] ABSTRACT

A covering and cleaning device for the character generator in an electrophotographic printing device is composed of an electromagnetically actuatable cover element (5) that covers the light exit region of the focusing optics (2) of the character generator when the printer is at a standstill or, respectively, during service work and forms a gap-like opening with the light exit region in an operating condition wherein the cover element releases the light exit region, cleaned air being blown through this gap-like opening. The air forms an air curtain (12) at the optics and thus prevents dust from depositing thereon.

8 Claims, 2 Drawing Sheets

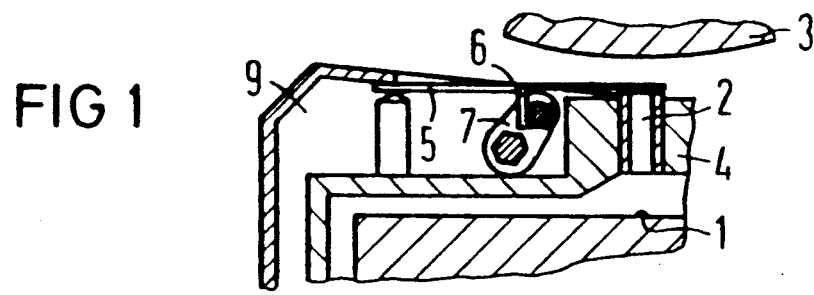
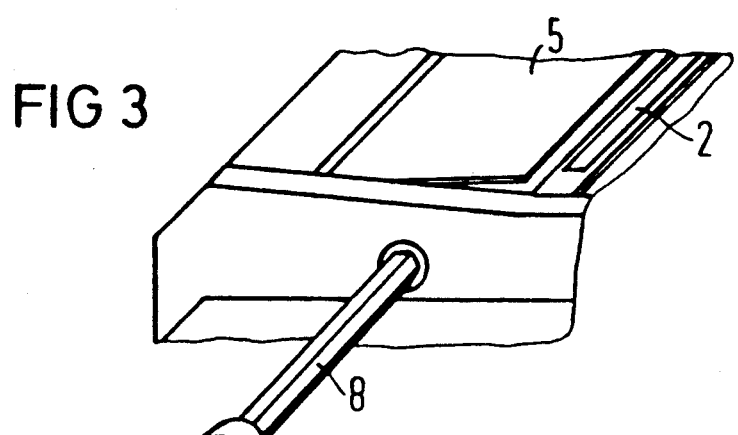
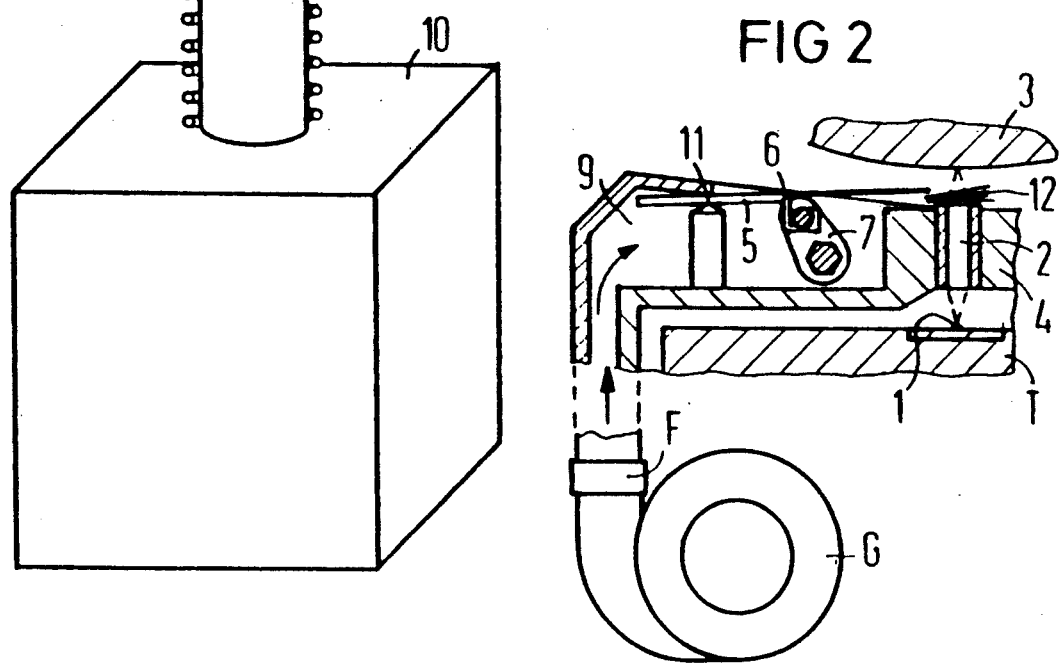

COVERING AND CLEANING DEVICE FOR THE OPTICAL CHARACTER GENERATOR IN AN ELECTROPHOTOGRAPHIC PRINTING DEVICE

The invention is directed to a character generator for a printing device operating according to the principle of electrophotography.

Printing devices operating according to the principle of electrophotography contain optical character generators. These optical character generators have the job of converting the printing information present in the form of electronic data into an optical image with which a photoconductive layer, for example a photoconductive drum, is then exposed. The exposed image is subsequently developed in a known fashion and is transferred, for example onto paper.

The light exit region of such optical character generators is situated in the immediate proximity of the photoconductive drum or, respectively, of the recording medium.

In electrophotographic printing devices, the charge image generated on the recording medium (photoconductive drum) via the optical character generator is inked with the assistance of a developing means, whereby one-component or two-component developers (toner) are employed.

Given employment of optical character generators in electrophotographic printing devices, there is the risk that the light exit region of the character generators will be contaminated by toner or dust. This disturbs the character generation in lasting fashion, because it significantly reduces the incident light power.

Such optical character generators that are composed of a LED ledge with allocated focusing means are disclosed by WO-A1-87/02162.

This known character generator for a printing device operating according to the principle of electrophotography comprises the following features:
  a plurality of light-emitting elements (LED) having light exit regions at the surface of the character generator are arranged on a carrier part,
  the single, covering photo element FE disclosed on page 9, paragraph 2, represents a type of covering means for the light exit region of the light-emitting elements from the character generator,
  the covering means FE is fashioned such that it covers the light exit region in a covering condition and releases the light exit region in an operating condition.

The covering means FE, however, does not thereby serve to prevent the adhesion of dirt and certainly does not serve as a cleaning means. It serves only as carrier element for the photo element FE.

U.S. Pat. No. 4,515,491 discloses a movable covering means having operating and idle position in a printer in order to prevent the penetration of dirt into the paper slot.

This, however, does thereby not involve an electrophotographic printer and the covering means does not cover the light exit region of light-emitting elements.

GB-A-1 008 965 and U.S. Pat. No. 3,710,099 disclose air-operated cleaning mechanisms for the light exit region in an optical sorting system.

These thereby do not involve a character generator, let alone a multi-purpose means for covering and cleaning.

Patent Abstracts of Japan, Volume 10, No. 318(M-503) (2274), Jul. 30, 1986 and JP-A-6 157 368 are concerned with a filter means for preventing the penetration of dirt into a mechanical printer, but are not concerned with a multi-purpose means for a character generator conforming to patent claim 1.

It is therefore an object of the invention to offer a device for a character generator of an electrophotographic printing device that enables the light exit region to be protected against deposits of dirt or, respectively, to offer a device that prevents dirt from adhering to the light exit region.

In a character generator of the type initially cited, this object is achieved according to patent claim 1.

Advantageous embodiments of the invention are characterized in the subclaims.

The covering and cleaning device covers the light exit region of the character generator when the printer is at a standstill as well as during service work and releases it in the operating condition.

An adequate protection against damage and against the deposit of dust is thus guaranteed.

It is also advantageously possible to clean the light exit region with the covering and cleaning device. Cleaning can occur either mechanically. For example, a lip or some other stripper element is arranged at a pivotable diaphragm element, this lip or other stripper element brushing the light exit region of the character generator. Alternatively, cleaning can occur in an especially advantageous fashion in that the diaphragm element together with the light exit regions forms a broad-jet outlet through which cleaned air is blown. The airstream sweeps over the optics of the optical character generator and, as an air curtain, prevents dust from settling on the optics.

In an advantageous way, the cleaned air is thereby conducted through an air delivery channel that discharges in the light exit region of the character generator. The diaphragm element thereby compresses the airstream in the light exit region, whereby the airstream proceeds such that it in fact covers the light exit region but does not transport the dirt against the photoconductive drum.

The diaphragm element can be controlled in a simple way by an electromagnet via a rod.

In a further, advantageous embodiment of the invention, the pivotable diaphragm element is coupled with a carriage that can be moved along the character generator under motor drive. In a first position of the carriage allocated to the cleaning or operating position of the character generator, the diaphragm element uncovers the light exit region or, respectively, actuates the cleaning mechanism. In a second position of the diaphragm element allocated to the idle position of the character generator, the light exit region is covered.

The carriage, for example, can be part of an exposure energy correction means. This coupling of the exposure energy correction means to the cover and cleaning device makes an additional drive element for the covering and cleaning device unnecessary. The coupling also guarantees a high operational reliability.

The arrangement of an actuation rod that projects into the displacement region of the carriage and that is coupled to a spring makes the structure of the covering and cleaning device and its actuation particularly simple.

An embodiment of the invention is shown in the drawings and shall be set forth in greater detail below by way of example. Shown are:

FIG. 1 a schematic sectional view of the covering and cleaning device in the covering position;

FIG. 2 a schematic sectional view of the covering and cleaning device when the light exit region of the optical character generator is open;

FIG. 3 a schematic illustration of the actuation device for the covering and cleaning device; and FIG. 4 a schematic illustration of a character generator, whereby the covering and cleaning device is coupled to an exposure energy correction means.

An electrophotographic printing device (not shown in detail here) contains an optical character generator. The latter comprises a LED ledge on which individually driveable diodes 1 are arranged whose light is transmitted onto a photoconductive drum 3 via a focusing optics 2 (selfoc-optics). The LED ledge comprising the diodes 1 is thereby situated inside a frame part of the character generator that carries the focusing optics, being situated therein protected against dust, and is arrange don a carrier part T of the character generator. The carrier part T thereby eliminates the heat arising in the activation of the light-emitting diodes 1 or, respectively, accepts the electrical leads. The light exit region of the focusing optics 2 and, thus, of the diodes 1 (light-emitting elements) is situated in the immediate proximity of the photoconductive drum 3 at a tight spacing therefrom. The individual light-emitting diodes (activated character-dependent) thereby generate a charge image on the surface of the photoconductive drum 3 (that, for example, can also be a photoconductive band). By exposure in a known way, this charged image is then subsequently developed in a developing station, transferred onto paper in a transfer station, and fixed in a fixing station.

A diaphragm element 5 fashioned oblong is arranged for protection against dust deposits on the light exit region of the optics 2 or, respectively, for protecting the optics against toner particles and for simultaneously cleaning the light exit region of the optics. This diaphragm element can be composed of a plastic casting and is secured to an actuation lever 7 of a rod 8 via a catch projection 6. The cover element 5 that extends over the entire width of the LED ledge (comprising the diodes 1 or, respectively, the light exit region of the focusing optics 2) forms the closure of an air delivery channel 9. Proceeding from a blower G, this air delivery channel 9 is supplied with cleaned air via a filter means F. This cleaned air, however, can also be branched off from the cooling air for the character generator via a bypass system (not shown here).

The cover element can be actuated dependent on the operating condition of the printer device, being actuated with the assistance of the rod 8 and of an electromagnet 10 coupled thereto. Given service work at the photoconductive drum or, respectively, at the printer and given printer standstill, the cover element 5 corresponding to the position 1 is displaced into the light exit region of the optics 2 by driving the electromagnet 10, whereby it covers the optics and, thus, protects the optical character generator against damage and against contamination.

During printer operation, the actuation element 7 is displaced in counter-clockwise direction via the rod 8. The actuation element 5 seated at one side in recesses 11 of the housing thereby lifts up in the region of the optics 2 and releases a gap 12 that extends over the width of the optics 2. Simultaneously, cleaned air is supplied via a blower and an air delivery channel 9. This cleaned air sweeps the light exit region of the optics 2 in compressed form and, as an air curtain 12, prevents dust deposits on the optics 2 or, respectively, frees the latter of dust deposits.

Instead of blown air for cleaning the light exit region of the optics, it is also conceivable in an embodiment not shown here to arrange a soft rubber lip or a piece of foamed material on the region of the cover elements 5 that sweep the optics. This piece of foamed material brushes the light exit region for cleaning or, respectively, covering this light exit region in a covering position.

In a further embodiment shown in FIG. 4, the character generator is fundamentally constructed according to WO87/02162 and contains a corresponding exposure energy correction means.

This exposure correction means comprises a carriage 13 that is moved along a guide rail 16 over the character generator with the assistance of a motor 14 and of a toothed belt 15. During a balancing routine, the carriage 13 thereby sweeps the light exit region (selfoc-optics 2) of the character generator. The carriage contains corresponding photo elements (not shown here) for sensing the light at the light exit region of the selfoc-optics 2.

An actuation rod 19 pivotable around a pivot point 18 is coupled to the rod 8 via a projection 17. The other end of the actuation rod 19 is secured to a projection 21 of the character generator via a spring 20. An actuation part 22 of the rod 19 projects into the displacement range of the carriage 13 and interacts with a fastening surface 23 of the carriage 13.

While the electrophotographic printing means is printing (i.e. in the operating position of the character generator) the carriage 13 is situated in the illustrated position A (shown with solid lines). This position is recognized by a magnet 24 at the carriage 13 in combination with a Hall sensor (not shown here) that is stationarily arranged thereover and is selectively activated by the printer control. This position A is selected in the cleaning and operating mode of the character generator. The diaphragm element 5 is situated in a position that releases the optics 2, i.e. is situated in a retracted position both during cleaning as well as during operation of the printer.

For cleaning, air is blown over the light exit regions of the optics 2 in the embodiment of FIGS. 2 and 3.

In the operating condition of the character generator and during cleaning, the spring 20 pulls the diaphragm element 5 into the opened position via the rod 19. In the illustrated exemplary embodiment, the rod 19 is formed of a steel band fashioned of one piece.

When the carriage is moved into position B in arrow direction for balancing, this open position of the diaphragm element 5 is retained via the spring 20.

In the idle position of the character generator, and when the printing device is shut off, the carriage 13 moves into the position C. The carriage 13 thereby places its actuation surface 23 against the actuation part 22 of the rod 19, and moves the rod 19, against the biasing force of the spring 20, beyond the position A by a stroke H. Via the projection 17, the actuation rod 19 thereby turns the diaphragm 5 into a closed position, in which it covers the light exit region of the optics 2. The movement is monitored by the printer control via a magnet 25 (arranged at the rod 8) and a corresponding Hall sensor at the character generator.

When ready to print, the carriage 13 is again moved into the position A via the printer control.

During a balancing process of the light-emitting elements 1 of the character generator, the carriage 13 moves over the light exit region of the optics 2 with uniform speed.

The rod 19 (and in particular the actuation part 22 thereof) is designed such in shape that it can compensate for mechanical tolerances and drive imprecisions.

I claim:

1. A character generator for a printing device operating according to the principle of electrophotography, said character generator comprising the following features:
   - a plurality of light-emitting elements having light exit regions at a surface of the character generator and being arranged on a carrier part;
   - a covering and cleaning device for said light exit region of said light-emitting elements of said character generator; and
   - wherein said covering and cleaning device is fashioned such that it covers said light exit region when said character generator is in an idle condition in order to prevent the penetration of contaminating particles, and exposes and cleans said light exit region when said character operator is in an operating condition.

2. A character generator according to claim 1, wherein said covering and cleaning device comprises a pivotable diaphragm element.

3. A character generator according to claim 2, wherein said covering and cleaning device directs an airstream onto said light exit region to clean said light exit region when said character generator is in a operation condition.

4. A character generator according to claim 3, further comprising an air delivery channel that discharges into the light exit region of the character generator, whereby said diaphragm element compresses said airstream over the light exit region to function as a broad-jet outlet.

5. A character generator according to claim 4, wherein filtered air is supplied to said air delivery channel.

6. A character generator according to claim 4, wherein said diaphragm element is connected to a magnetic actuation element via a rod.

7. A character generator according to claim 5, wherein said pivotable diaphragm element is coupled such to a motor-driven carriage that is movable with respect to said character generator, wherein said diaphragm element is arranged to clean said light exit region when said carriage is in a first position of said character generator, and further wherein said diaphragm element is arranged to cover said light exit region when said carriage is in a second position corresponding to said idle position of said character generator.

8. A character generator according to claim 7, further comprising an actuation rod coupled to said diaphragm element, said actuation rod projecting into a path of travel of said carriage, whereby, in said first position of said carriage, said actuation rod pivots said diaphragm element, via a spring, into a position that uncovers said light exit region; and further wherein, by movement of said carriage into said second position, said carriage pivots said diaphragm element through contact with said actuation rod.

* * * * *